(12) United States Patent
Lowry et al.

(10) Patent No.: US 10,282,198 B2
(45) Date of Patent: May 7, 2019

(54) MECHANISMS TO PERSIST HIERARCHICAL OBJECT RELATIONS

(71) Applicant: Micro Focus Software Inc., Wilmington, DE (US)

(72) Inventors: Lee Edward Lowry, Orem, UT (US); Rajesh Vasudevan, Sandy, UT (US); Brent Thurgood, Spanish Fork, UT (US); Ryan Cox, Provo, UT (US); Zack Grossbart, Cambridge, MA (US); William Street, Orem, UT (US); Volker Gunnar Scheuber-Heinz, Pleasant Grove, UT (US); Stephen R Carter, Spanish Fork, UT (US)

(73) Assignee: Micro Focus Software Inc., Wilmington, DE (US)

( * ) Notice: Subject to any disclaimer, the term of this patent is extended or adjusted under 35 U.S.C. 154(b) by 197 days.

(21) Appl. No.: 14/153,263

(22) Filed: Jan. 13, 2014

(65) Prior Publication Data

US 2014/0130005 A1     May 8, 2014

Related U.S. Application Data

(62) Division of application No. 13/182,887, filed on Jul. 14, 2011, now Pat. No. 8,631,032, which is a division
(Continued)

(51) Int. Cl.
*G06F 8/71*      (2018.01)
*G06F 17/30*    (2006.01)
*G06Q 10/10*   (2012.01)

(52) U.S. Cl.
CPC .......... *G06F 8/71* (2013.01); *G06F 17/30958* (2013.01); *G06Q 10/10* (2013.01)

(58) Field of Classification Search
CPC ......... G06F 17/30569; G06F 17/30643; G06F 17/30651; G06F 17/30908; G06F 17/30932; G06F 17/30011; G06F 17/30067; G06F 17/30554; G06F 17/30194; G06F 17/30867; G06F 17/30864; G06F 17/30905;
(Continued)

(56) References Cited

U.S. PATENT DOCUMENTS 5,890,147 A * 3/1999 Peltonen ........... G06F 17/30011
5,987,471 A * 11/1999 Bodine ............. H04L 29/12009
(Continued)

OTHER PUBLICATIONS

U.S. Appl. No. 12/137,629, filed Jun. 12, 2008, U.S. Pat. No. 7,996,429, Mechanisms to Persist Hierarchical Object Relations.
(Continued)

*Primary Examiner* — Jeff A Burke
*Assistant Examiner* — Katriel Y Chiu
(74) *Attorney, Agent, or Firm* — Schwegman Lundberg & Woessner, P.A.

(57) ABSTRACT

Mechanisms to persist object relations are provided. A project is defined as a series of interrelated objects having dependencies and relationships with one another. The dependencies and relationships are maintained via a storage organization for files that define the objects within a project storage environment for the project. Thus, the dependencies and relationships are not maintained via hardcoded instructions or references that are included within the files.

16 Claims, 5 Drawing Sheets

Related U.S. Application Data of application No. 12/137,629, filed on Jun. 12, 2008, now Pat. No. 7,996,429.

(58) Field of Classification Search
CPC ......... G06F 17/30958; G06F 17/30156; G06F 17/30241; G06F 17/30699; G06F 17/30702; G06F 17/30017; G06F 17/30348; G06F 17/30595
See application file for complete search history.

(56) References Cited

U.S. PATENT DOCUMENTS

| | | | |
|---|---|---|---|
| 6,148,349 A | 11/2000 | Chow et al. | |
| 6,247,077 B1 | 6/2001 | Muller et al. | |
| 6,341,291 B1 | 1/2002 | Bentley et al. | |
| 6,578,024 B2 | 6/2003 | Kuypers | |
| 6,633,869 B1 | 10/2003 | Duparcmeur et al. | |
| 6,772,168 B2 | 8/2004 | Ardoin et al. | |
| 6,968,340 B1 | 11/2005 | Knowles | |
| 7,117,229 B2 | 10/2006 | Marshall et al. | |
| 7,228,306 B1* | 6/2007 | Altman | G06F 17/30067 |
| 7,231,400 B2 | 6/2007 | Cameron et al. | |
| 7,290,007 B2 | 10/2007 | Farber et al. | |
| 7,400,322 B1* | 7/2008 | Urbach | G09G 5/14 |
| | | | 345/419 |
| 7,543,271 B2 | 6/2009 | Gadre | |
| 7,577,754 B2 | 8/2009 | Garcia-Luna-Aceves et al. | |
| 7,610,316 B2* | 10/2009 | Bartz | G06F 8/60 |
| 7,673,287 B2* | 3/2010 | Mayer-Ullmann et al. | 717/124 |
| 7,676,499 B2* | 3/2010 | Dorsett, Jr. | G06F 19/702 |
| | | | 707/999.107 |
| 7,792,773 B2 | 9/2010 | McCord et al. | |
| 7,873,649 B2* | 1/2011 | Krishnaprasad | G06F 17/30595 |
| | | | 707/706 |
| 7,921,158 B2 | 4/2011 | Mandalia et al. | |
| 7,996,429 B2 | 8/2011 | Lowry et al. | |
| 8,024,511 B2 | 9/2011 | Weddle | |
| 8,161,035 B2* | 4/2012 | Zhang | G06F 17/30463 |
| | | | 707/713 |
| 8,306,922 B1* | 11/2012 | Kunal | G06Q 30/02 |
| | | | 705/319 |
| 8,631,032 B2 | 1/2014 | Lowry et al. | |
| 8,843,481 B1* | 9/2014 | Xu | G06F 17/30867 |
| | | | 707/732 |
| 2002/0180803 A1* | 12/2002 | Kaplan | G06F 17/30017 |
| | | | 715/810 |
| 2003/0236788 A1* | 12/2003 | Kanellos | G06F 17/30286 |
| 2004/0249846 A1* | 12/2004 | Randall | H04M 1/576 |
| 2005/0108293 A1* | 5/2005 | Lipman | G06F 17/30011 |
| 2005/0198201 A1* | 9/2005 | Bohn et al. | 709/218 |
| 2005/0223392 A1* | 10/2005 | Cox | G06Q 10/06 |
| | | | 719/328 |
| 2005/0288956 A1* | 12/2005 | Speicher | 705/1 |
| 2006/0112083 A1 | 5/2006 | Takase et al. | |
| 2006/0117031 A1 | 6/2006 | Berg | |
| 2007/0174763 A1* | 7/2007 | Chang et al. | 715/513 |
| 2007/0233645 A1* | 10/2007 | Peterson et al. | 707/3 |
| 2008/0005194 A1* | 1/2008 | Smolen | G06F 17/30348 |
| 2008/0120129 A1* | 5/2008 | Seubert | G06Q 10/06 |
| | | | 705/35 |
| 2009/0313281 A1 | 12/2009 | Lowry et al. | |
| 2010/0023919 A1 | 1/2010 | Chaar et al. | |
| 2010/0082631 A1* | 4/2010 | Meretab | G06F 17/2765 |
| | | | 707/741 |
| 2010/0318974 A1 | 12/2010 | Hrastnik et al. | |
| 2011/0137915 A1* | 6/2011 | Bahl et al. | 707/747 |
| 2011/0219353 A1 | 9/2011 | Simpson et al. | |
| 2011/0276593 A1 | 11/2011 | Lowry et al. | |

OTHER PUBLICATIONS

U.S. Appl. No. 13/182,887, filed Jul. 14, 2011, U.S. Pat. No. 8,631,032, Mechanisms to Persist Hierarchical Object Relations.

\* cited by examiner

MECHANISMS TO PERSIST HIERARCHICAL OBJECT RELATIONS

This application is a divisional of U.S. patent application Ser. No. 13/182,887, filed on Jul. 14, 2011, now issued as U.S. Pat. No. 8,631,032, which is a divisional of U.S. patent application Ser. No. 12/137,629, filed on Jun. 12, 2008, now issued as U.S. Pat. No. 7,996,429, which are all incorporated herein by reference in their entireties.

BACKGROUND

Collaborative environments are becoming pervasive in the industry. One area of collaboration that is critical to an enterprise is that which is associated with new software development. During software development a variety of different developers can be working on the same or dependent modules at the same time and in entirely different processing environments. A variety of different project lifecycle and version control systems attempt to coordinate project activities in scenarios such as this.

One issue with code-based team environments is that the code modules often include a variety of dependencies and are in hierarchical relationships with one another. So, code module A may be a parent module to code modules B and C. The typical manner in which these relationships between parent and children are managed is via pointers. So, the parent module A includes two pointers to children B and C; and each child B or C include a back pointer to parent A.

Any developer readily appreciates the nightmare that a large complex development environment can quickly become when trying to keep these pointers updated and in synchronization with one another. Moreover, one developer may be modifying a parent module at the same time another developer needs to modify the same parent module. So, conflicts can readily occur leading to lock outs or inconsistencies in the modules themselves.

Thus, improved mechanisms are needed for managing module relationships and dependencies within a project-based environment.

SUMMARY

In various embodiments, mechanisms to persist hierarchical object relations are provided. More specifically, and in an embodiment, a method is provided for maintaining object relations within a project. A first object is identified that is a parent to a second object. A first directory is created using a first identifier for the first object. Finally, a second file is stored that defines the second object in the first directory to establish a hierarchical dependency between the first object and the second object via storage of the second file in the first directory.

DETAILED DESCRIPTION

Figure 1A:
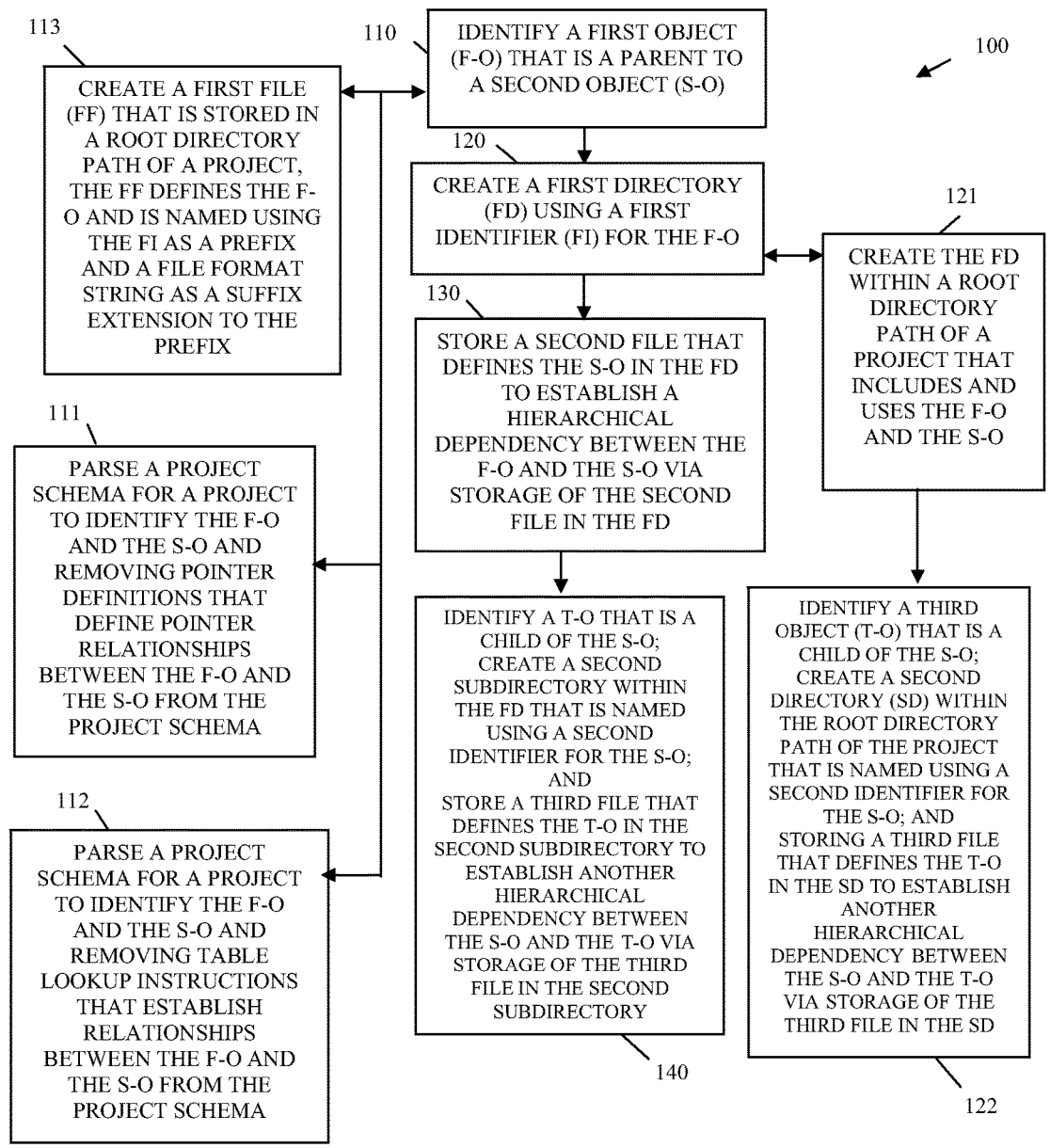
FIG. 1A is a diagram of a method for maintaining object relations within a project, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "software module" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

Also, as used herein an "object" may also be used interchangeably with the usage of "resource." Another type of resource, such as a file, can be used to physically define the object. The file includes metadata or a schema for the object. As defined herein, the files do not include parent-child (usage of the term "parent" may also include "containment") dependencies that are relied upon to establish inter-object dependencies; rather, the mechanisms presented herein and below define, manage, and establish hierarchical relations between objects via a physical storage organization of the files.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other options of the project use different processing environments.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1A, 1B, 1C, 1D, 2, 3, and 4.

FIG. 1A is a diagram of a method 100 for maintaining object relations within a project, according to an example embodiment. The method 100 (hereinafter "object relationship service") is implemented as instructions in a machine-accessible and readable medium. The instructions when executed by a machine (processor and memory enabled device, such as a computer, etc.) perform the processing depicted in the FIG. 1. The object relationship service is also operational over and processes within a network. The network may be wired, wireless, or a combination of wired and wireless.

As will be more fully described herein and below, the object relationship service permits parent-child (containment) dependencies and other hierarchical-based dependencies for objects defined within a project to be created and maintained via an underlying physical storage arrangement or organization. Conventionally, the approach has been to use embedded references within the object definitions or to use embedded instructions within the object definitions that perform table lookups to locate dependencies.

At 110, the object relationship service identifies a first object that is a parent (container) to a second object. That is, the object relationship service establishes that there exists a hierarchical relationship between the first object as a parent (container) object and second object that is a child object to the parent object. The object relationship service can identify the parent-child relationship in a number of manners. For example, the project may be created via an editor that alerts the object relationship service when the parent-child relationship is created. In another case, a legacy project definition or schema can be parsed to reorganize the project into a file storage organization that identifies the hierarchical relations.

When this latter approach is used and in a particular embodiment, at 111, the object relationship service parses a project schema and/or project files for a project to identify the first object (parent) and the second object (child). The object relationship service then removes any pointer definitions that define pointer relationships between the first object and the second object from the project schema. In other words, a legacy defined project that includes conventional hierarchical relations defined in terms of hardcoded references to the object dependencies, can be corrected in an automated fashion, such that these object dependencies are removed within the files that define the objects. This provides greater flexibility as is discussed more completely herein and below.

In another situation, at 112, the object relationship service pareses a project schema and/or project files defined by the project schema to identify the first object and second object. The object relationship service then removes any table lookup instructions from the project files/schema that are being used to establish relationships or dependencies between the first object and the second object. In this case, the project files/schema includes software instructions hardcoded in the files for looking up and resolving object dependencies. The object relationship service can remove these references in an automated fashion; again, the parent-child relationship is defined (as described below) via the file structure created, used, and managed by the object relationship service and hardcoded relations can be removed to provide greater flexibility (also discussed in greater detail below).

According to an embodiment, at 111, the object relationship service creates a first file that is stored in a root directory path of a project. The first file defines the first object and is named using a first identifier (discussed below at 120) as a prefix and a file format string as suffix extension to the prefix.

For example, suppose object X is identified via an identifier of DC37A56G. A root directory is established for the project within a project storage environment as "/DC37A56G." Next, suppose the first object is identified via an identifier of F7MB526X. The file that includes the metadata that defines the first object is then stored in the project storage environment as "/DC37A56G/F7MB526X.xml. Here, the prefix is the first identifier of F7MB526X and the suffix is ".xml" that identifies an extensible markup language (XML) file format. So, the first file that defines the first object is identified as "F7MB526X.xml" and it is stored in the root directory of "/DC37A56G."

This naming convention can be used for the other embodiments discussed herein. It is however noted that any consistently reproducible and unique naming convention can be used without departing from the teachings presented herein and below.

At 120, the object relationship service creates a first directory using a first identifier for the first object. The mere presence of the first directory having a name that uses the first identifier for the first object indicates to the object relationship service that the first object includes child object relations and that these relations can be found within the first directory. So, hierarchical relations or dependencies between the first and second object are maintained in the file structure and organization and not as hardcoded references within the objects themselves.

In a particular case, at 121, the object relationship service creates the first directory within a root directory path of a project that includes the first and second objects. In this case, the first object may be a root object of the project such that it is defined within the root directory path. Thus, the first directory is defined and available at the root directory path. In other cases, the first object may itself be a child to another object, such that the first directory is created within a directory that defines the first object's parent. In still more cases, each and every parent object may include a subdirectory that is located at the root directory path level.

So, a parent object includes children objects by definition and that relationship to the children is defined and maintained via a subdirectory that includes an identifier for the parent object. The placement of the subdirectory can occur in context and nested within the directory structure and/or can exist within the root directory. In some cases, both situations exists such that some configurable level of nesting is permitted and once reached all other subdirectories are found back in the root directory.

For example, suppose just 2 levels of nesting are permitted and there exist objects A, B, C, and D. A is a parent to B, B is a parent to C, and C is a parent to D. The object identifiers are just A, B, C, and D for purposes of illustration. The project is identified by P. The file structure in such a scenario includes a directory /P at the root that includes file A.xml (definition for object A) and subdirectories /P/B and /P/D. Subdirectory /P/B includes file B.xml (definition for object B) and subdirectory /P/B/C. Subdirectory /P/B/C includes file C.xml (definition for object C. Because only 2 levels of nesting were permitted, the subdirectory of /P/D includes file D.xml (definition for object D) and is found at the root. So, nesting or root level subdirectories can be used to establish parent-child relations and as illustrated in this example a cross implementation utilizing both nesting and root level access can be deployed.

Continuing with the embodiment of 121 and at 122, the object relationship service identifies a third object that is a child of the second object. Here, in this embodiment, the object relationship service creates a second subdirectory within the root directory path of the project using a second identifier for the second object. A third file that defines the third object is then stored in the second directory to establish another hierarchical dependency between the second-object and the third object. Again, this dependency is defined via the physical storage arrangement being maintained by the object relationship service. This embodiment reflects maintaining parent-child relations at a root level of the storage via subdirectories as discussed above. The actual second directory can also be created as a subdirectory under the first directory (discussed below again at 140).

At 130, the object relationship service stores the second file that defines the second object in the first directory to establish a hierarchical dependency between the first object and the second object that is defined and managed by the object relationship service via the storage of the second file in the first directory.

According to an embodiment, at 140, the object relationship service identifies a third object that is a child of the second object. Next, the object relationship service creates a second subdirectory within the first directory that is named using a second identifier for the second object. The object relationship service then stores a third file that defines the third object in the second subdirectory to establish another hierarchical dependency between the second object and the third object via the storage of the third file in the second subdirectory. This is an example of nested subdirectories that was discussed above.

The object relationship service presents a variety of benefits and opportunities that conventionally were problematic. Consider the following illustrations that elaborate on the techniques and benefits of the object relationship service in view of conventional approaches.

A project typically includes a web of objects where version control is a necessity. One aspect of the object relationship service ensures that a web of objects can be laid down on a file system so that they can actually be effectively versioned. The object relationship service focuses on the key parent/child relationship aspect of that "web". Many conventional file-based model systems, such as Eclipse's EMF (Eclipse Modeling Framework), just dump a bunch of model files in a flat directory with each of those files pointing to other files having attributes defining their internal relationships. This makes tying such models into version control a very difficult exercise if not impossible to achieve in some development environments.

The object relationship service implements a mechanism for how such relationships can be represented in a file system to best interact in a version-controlled team environment. It proposes a technique of mapping parent/child objects to a hierarchy of directories and has specific mechanisms for how best to do that.

It's important to save model files to a hierarchy for the following reasons:

1) Easier to manage delete operation in a version controlled environment. Deleting objects in a hierarchy is just a matter of deleting one folder with the object relationship service. However, deleting objects in a flat file structure requires specific calls to delete each file and then a call to the parent directory to commit those changes to the version control server. This requires all changes to the model to be committed every time one file is deleted.

2) Greatly reduce risk of losing changes (to other objects) when reverting delete operations. In most version control systems, reversing a delete operation must be done on the parent directory of the deleted file. If one is using a flat file structure then the revert must affect every file in the model. Hierarchical files structures as proposed with the object relationship service allows reverts that just affect specific objects.

3) Easier to see and find files—otherwise, they all appear in one massive flat directory. When a project has thousands of files, this becomes unmanageable as the project tries to find and look at these files during development.

Figure 1B:
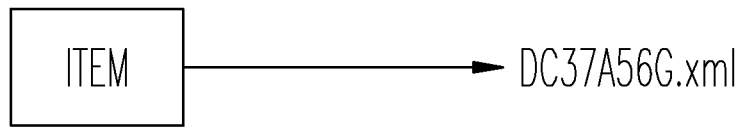
FIG. 1B is a diagram depicting a relationship between a model item and its file, according to an example embodiment.
Figure 1C:
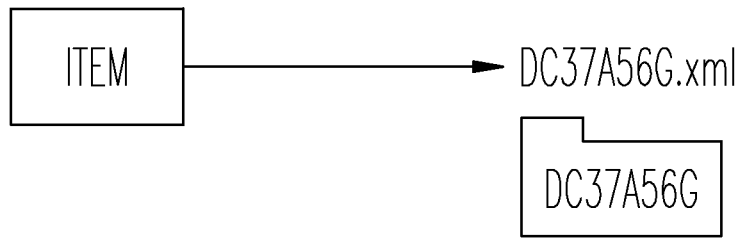
FIG. 1C is a diagram depicting the item of the FIG. 1B obtaining a child, according to an example embodiment.
Figure 1C:
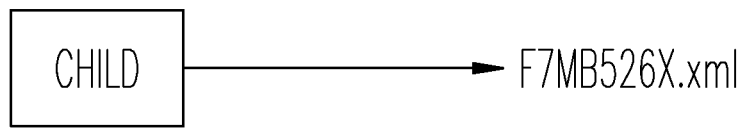
Figure 1D:
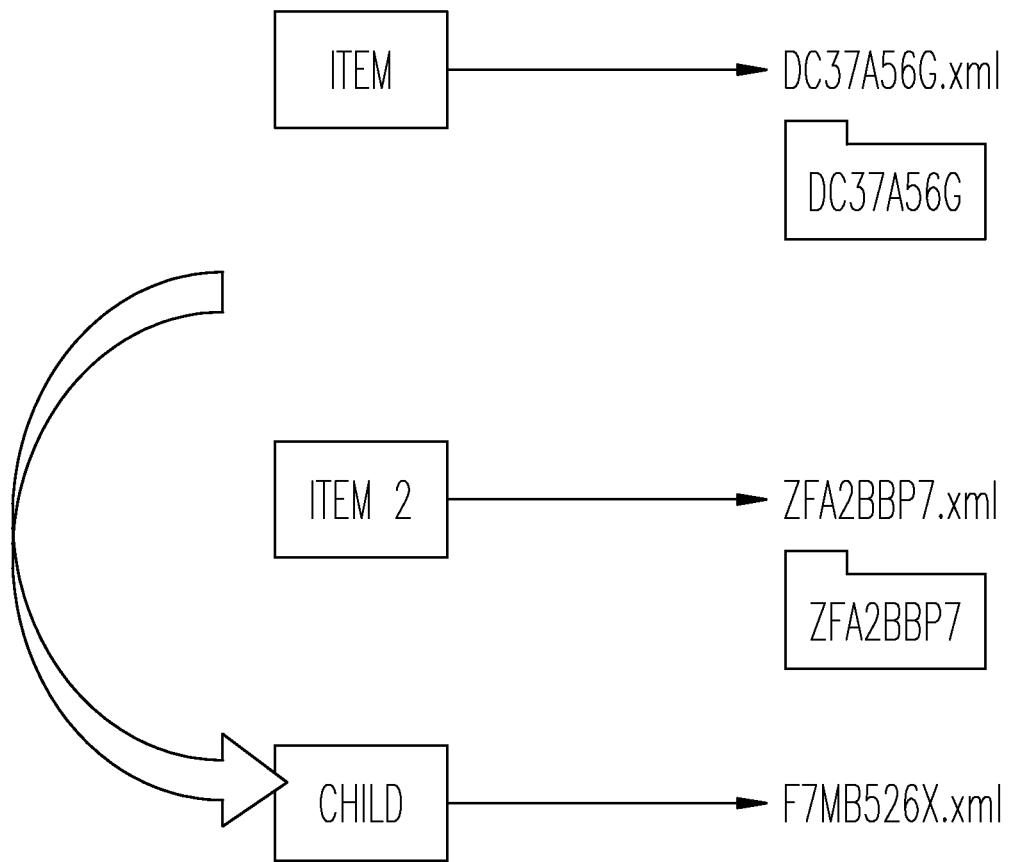
FIG. 1D is a diagram depicting a move of a child file from one item to another item, according to an example embodiment.

When a developer wishes to persist an item in memory to disk, it is saved to a file—usually an XML file that represents the data of the object. If that object has child objects, rather than have attributes in the XML that point to child objects, the following mechanism can be applied via the object relationship service:

1. Create a folder for the parent object
2. Place all child object within the folder
3. If an item doesn't have children, there is no folder
4. If an item has children in a folder, but then those children get deleted, then the folder can optionally be automatically deleted as well
5. If an item is deleted that has children, there is a mechanism to delete the folder and all child objects in the folder To date, file systems have a concept of folders and files, but the object relationship service has unique aspects that build on this, yet are differentiated. Some differentiating points are:

1. This mechanism can work for any in-memory model of parent/child relationships between any two types of objects (not just file systems)
2. It imposes naming rules and structure to allow for uniqueness of objects and necessary depth to model real-world systems
3. It allows for children to be added without affecting the parents, which is optimal in a version-controlled team environment For the object relationship service to work generically, the name of the folder matches the root name of the file. To illustrate this point again, the FIG. 1B shows the relationship between a model item and its file:

Let's say that this item now gets a child. The FIG. 1C shows how it would be stored:

The following shows what you will see in your project workspace for the above example:

workspace\project\component\DC37A56G\F7MB526X.xml

It will have a folder by that same name that exists at the same level. This way, one can always infer the relationship between the folder and the object without needing to store additional information in the file.

The above approach has the following benefits:

1) Keeps model files smaller
2) Allows Dynamic future children—this allows one to drop in any child under a parent without that parent having to have any foreknowledge of that object. This gives the project management systems a tremendous amount of dynamic capability that is extensible for the future.

3) Reduces tension in a team-enabled environment—this is important, because as an object gets children or children are removed, one does not ever need to update the object's file. This keeps tension lower in a team-enabled/version controlled environment. In other words, if one added/removed a child, the parent item doesn't go dirty to reflect that relationship. This way, one does not put that object at risk of conflicting with changes that someone else may have made on that object. This is particularly important for parent objects, because they tend to have a high amount of shared usage across multiple people in a team environment.

4) Allows for easier movement of files in a team environment—similar to point (2), one can easily move child objects from one parent to another without affecting either parent, and without affecting the internals of the object that they are moving. In other words, one does not need to change the internal data of the object that is being moved. This is very nice because many version control systems support the notion of a file move that will preserve the history of that object. So, in the following example (figure attached below), one can move the child file from Item to Item 2 and not dirty any of the files in the process.

For object references and the hierarchy to work, the hierarchy needs to be unique. For the hierarchy to be unique, the file names need to be unique. In an embodiment, an identifier ID is randomly generated using characters A-Z and numbers 0-9 to represent each object and file. Using this on even an 8-digit name, will give one less than a 1 out of 2.8 trillion chance (2,821,109,907,456 to be exact) of coming up with the same ID. This is sufficiently unique for most systems, especially when one considers that the objects are nested in a hierarchy. So, even if one did, by some remote chance, end up generating another ID somewhere that was the same, it would almost always be in a different directory hierarchy and therefore, still unique for most types of models.

Of course, the more digits one adds, the more unique one's ID becomes. By using 16 digits, one will have a one in a 7 septillion chance, which exceeds (by a factor of 7) the definition of Globally Unique, where one can guarantee the uniqueness of an object's ID across time and space.

However, back in the local universe, keeping the ID short is important because one may nest their contained objects and folders. The problem is that Windows XP/Vista has a hard limit on how long a directory path may be before it ceases to work (255 characters). This means that with the above approach one should be able to handle about 19 levels of directories, given that root of the project path will contain upwards of 100 characters already.

One is not capable of imagining a real-world scenario where the user would need to nest deeper than a dozen directories. Storing objects will likely push directory depth the most, but even then, going deeper than a dozen directories seems pretty contrived. Once one gets any deeper than this, one will have other inconveniences in managing these objects because of the sheer amount of drill down and navigation in the tools, and the amount of conceptual "depth" in one's model that one has to deal with.

If 19 levels of directories becomes an issues, this can be worked around by shortening the root part of the project's path, by keeping it shallow. One can add 5-6 additional levels by doing that.

The mechanism for serializing the above the model is to get an object. If it has children objects, save each of those out under its folder. If a folder doesn't exist, create it. Recursively process through each of the child objects and create folders and grand-children, great-grandchildren, etc. for as many levels deeps as the model goes.

The mechanism for reading in objects is to get an object. One can tell if it has children by checking for contents in its folder. Once an object is loaded, one can establish an in-memory tie between the two to know which is the parent and which is the child, but that information doesn't need to be serialized into the file.

All other relationships can be stored as references in each object. This includes the ability to have contained relationships where an object can appear to be a parent of another, but really isn't. The true parent/child relationships can be handled by the mechanism disclosed herein. This is different because the relationship of parent/child is the most fundamental when it comes to modeling. Without this, one has no object, because this defines containment, and containment defines existence. Without existence, one can have no other relationship.

There are two ways to do this. Each object can declare its type. For example:

```
<Object name="Policy 1" type="Stylesheet">
    <attribute name="foo" value="value"/>
</Object>
<Object name="Policy 2" type="Stylesheet">
    <attribute name="foo" value="value"/>
</Object>
```

In this example, there are two objects that are both of type "Stylesheet". So, if one has the parent object, it becomes very easy to get all of the children and filter out the ones that are of type "Stylesheet" and get a sub-list of objects based on type.

However, it becomes much more difficult to filter out at the next level. That is—how does one get all Stylesheets that are used for Data Cleansing. One defines children relations of a certain type as follows:

```
<Object name="Foo" type="A">
    <relations name="DataCleansing" type="Child" key="123ABC56"/>
    <relations name=" DataCleansing " type="Child" key="777GHI12"/>
    <relations name="SecurityCompliance" type="Child" key="62A25527"/>
</Object>
```

(Note: Let's say that each of these children is an object that is of type "Stylesheet")

This way, the object-loader can load the children and then categorize them by type dynamically. This is a nice mechanism because the usage (hence the type) of these objects (from the viewpoint of how they are being consumed) can be defined outside of the objects. This allows for all sorts of dynamic future usage that can't be foreseen when the object is first created, and this works really well in a team-enabled versioned environment with a complex project that can evolve over time.

So, with the object relationship one can say, "Give me all of the children of Foo". One can also say, "Give me all of the children of Foo that are of type Stylesheet". One can now say, "Give me all of the children of Foo that are of type Stylesheet that are used in DataCleansing. This gives one the semantics to define the relationships and the mechanism to generically store and recover such objects. This particular need is very common and highly useful in most real-world modeling environments; therefore, it's a significant embodiment of the object relationship service discussed herein and above.

Figure 2:
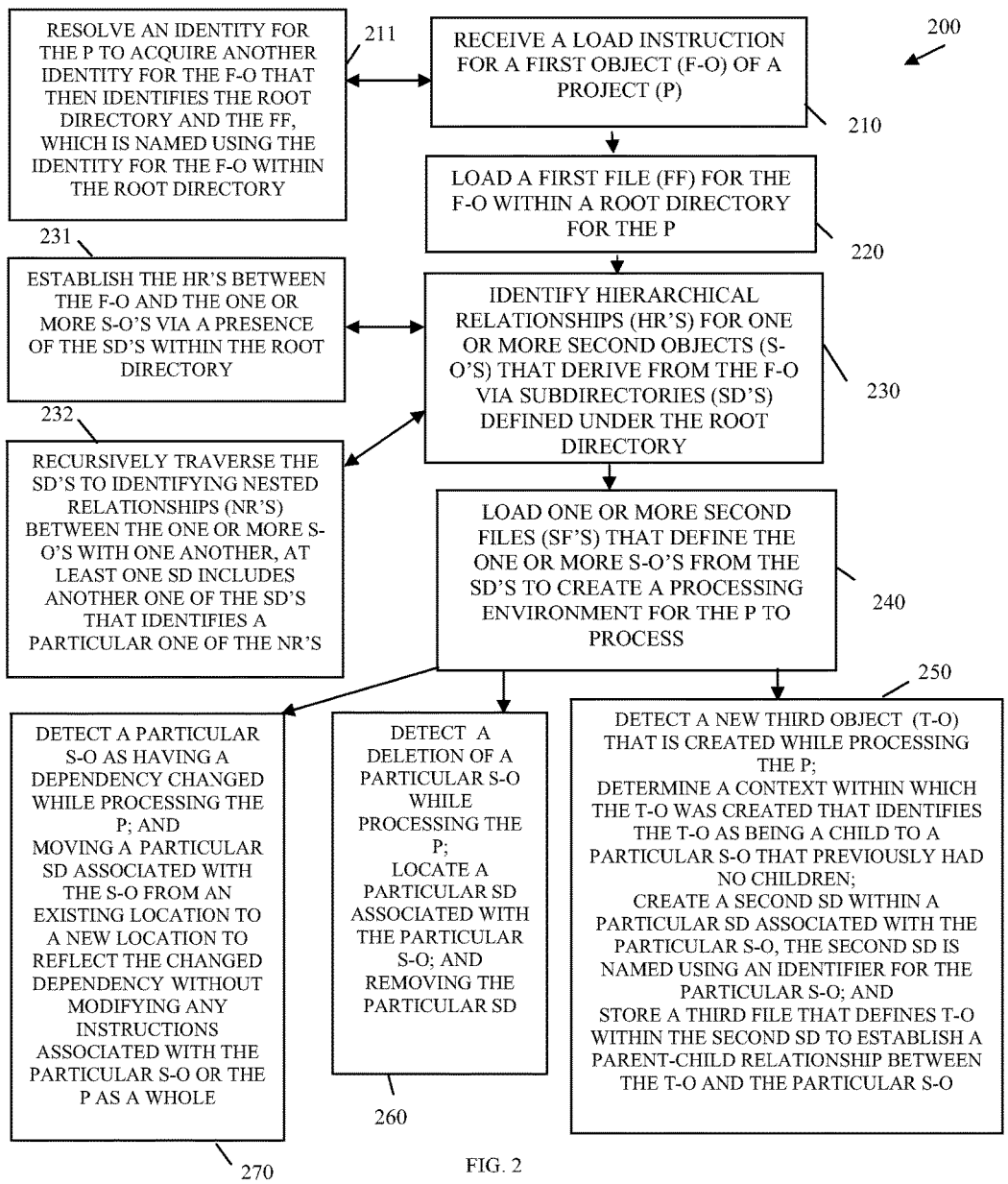
FIG. 2 is a diagram of a method for loading and managing object relations for a project, according to an example embodiment.

FIG. 2 is a diagram of a method 200 for loading and managing object relations for a project, according to an example embodiment. The method 200 (hereinafter "project relationship manager") is implemented as instructions in a machine-accessible and readable medium. The instructions when executed by a machine perform the processing depicted in the FIG. 2. The project relationship manager is also operational over and processes within a network. The network may be wired, wireless, or a combination of wired and wireless.

The project relationship manager represents a mechanism that can be used after the object relationship service (discussed above with respect to the method 100 of the FIG. 1A initially creates a storage organization for objects of a project. The project relationship manager can then use the storage organization load and manage the object of the project.

At 210, the project relationship manager receives a load instruction for a first object of a project.

According to an embodiment, at 211, the project relationship manager resolves an identity for the project to acquire another identity for the first object. The identity of the project identifies the root directory and the identity of the first object identifies a first file that defines the first object and that is located within the root directory. So, the first file is named using the identity for the first object and is stored in the root directory. Example naming conventions for achieving this were presented in detail above with reference to the method 100 of the FIG. 1A.

At 220, the project relationship manager loads a first file for the first object within a root directory for the project. That is, the first file is acquired in the manner discussed above and the instructions and data defining the first object are processed to load the first object for processing within the project.

At 230, the project relationship manager identifies hierarchical relationships for one or more second objects that derive from the first object. This is done by identifying subdirectories defined under the root directory. Each subdirectory associated with parent object and each subdirectory identifying one or more of the second objects as children to a particular parent object.

According to an embodiment, at 231, the project relationship manager establishes the hierarchical relationships between the first object and the one or more second objects by the mere presence of the subdirectories within the root directory. So, the mere presence of subdirectories indicate to the project relationship manager that hierarchical relationships exists between the first object and the second objects. The storage structure defines the dependencies and not hardcoded references within data files that define the objects themselves.

In one situation, at 232, the project relationship manager recursively traverses the subdirectories to identify nested relationships between the one or more subdirectories with one another. Furthermore, at least one subdirectory includes another one of the subdirectories that identifies a particular one of the nested relationships. So, at least one second object is a parent to another second object and this is identified via a nested subdirectory within the project storage. Examples of this were provided in detail above with reference to the method 100 of the FIG. 1A.

At 240, the project relationship manager loads one or more second files that define the one or more second objects from the subdirectories to create a processing environment for the project to be processed within. Each second object includes its own data file defining its configuration and contents, which can be acquired from specific subdirectories and loaded within particular processing contexts to establish the in memory dependencies that permit the project to be processed.

In an embodiment, at 250, the project relationship manager detects yet another third object (new object) that is created while the project is processed within the project processing environment. Next, the project relationship manager determines a processing context within which the third object is being created. The context identifies the third object as being a child to a particular one of the second objects that previously had no children. So, basically a new object is created that is a child to an object that previously had no children and so did not have a subdirectory within the project storage environment. Accordingly, the project relationship manager creates a second subdirectory within a particular subdirectory associated with the particular second object that is now a parent to the new third object. The second subdirectory is named using an identifier for the particular second object. Finally, the project relationship manager stores a third file that defines the new third object within the second subdirectory that is newly created. This storage arrangement and organization now establishes a parent-child relationship between the particular second object and the new third object.

In another situation, at 260, the project relationship manager detects a deletion of a particular second object while the project is being processed within the project processing environment. In response to this, the project relationship manager locates a particular subdirectory associated with the particular second object being deleted and removes that particular subdirectory from the project storage environment. This is all that is needed to completely remove the relationship of the deleted second object.

Similarly and in a different embodiment, at 270, the project relationship manager detects a particular second object as having a dependency being changed while the project is processing within the project processing environment. In response thereto, the project relationship manager moves a particular subdirectory associated with the second object from an existing location within the project storage environment to a new location within the project storage environment to reflect the changed dependency. This is done without modifying any instructions associated with the particular second object or the project as a whole.

Figure 3:
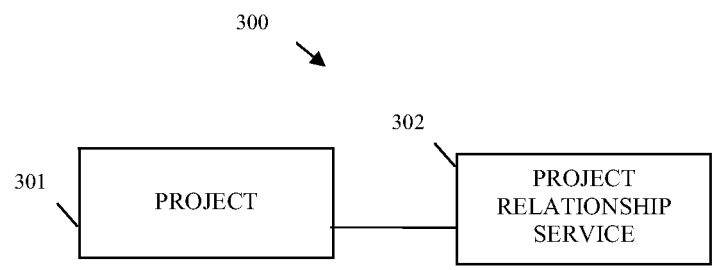
FIG. 3 is a diagram of an object relationship management system, according to an example embodiment.

FIG. 3 is a diagram of an object relationship management system 300, according to an example embodiment. The object relationship management system 300 is implemented as instructions on or within a computer-readable storage medium and a machine accessible and readable medium. The instructions when executed by a machine (computer, etc.) perform various aspects of the processing depicted with respect to the method 100 of the FIG. 1A and the method 200 of the FIG. 2. The object relationship management system 300 is also operational over a network and the network may be wired, wireless, or a combination of wired and wireless.

The object relationship management system 300 includes a project 301 and a project relationship service 302. Each of these components and their interactions with one another will now be discussed in turn.

The project 301 is implemented in a machine-accessible and a computer-readable storage readable medium as hierarchical objects that process on machines of the network. Example aspects of the objects associated with the project were presented above with reference to the methods 100 and 200 of the FIGS. 1A and 2, respectively.

The project 301 is defined via a project schema and includes a set of project files that define the objects of the project 301. The objects are arranged hierarchically to include inter-object dependencies.

The project relationship service 302 is implemented in a machine-accessible and computer-readable storage medium and is to process on one of the machines of the network. Example processing associated with the project relationship service 302 was presented in detail above with reference to the methods 100 and 200 of the FIGS. 1A and 2, respectively.

Dependencies between the hierarchical objects are undefined within data files that define the hierarchical objects. The dependencies are managed via the project relationship service 302 through a physical organization of the data files within a project storage environment.

According to an embodiment, the project relationship service 302 creates and manages subdirectories under a root directory within the project storage environment. Each subdirectory identifies a parent object that includes one or more children objects within that subdirectory. So, each parent object includes its own subdirectory at a root level of the root directory for the project within the project storage environment.

In some cases, each parent object includes its own subdirectory at a nested level within the root directory. The nested level is determined in response to whether a particular parent object is itself a child object and when this is the case that particular parent object's subdirectory is located under another subdirectory associated with a parent of the particular parent object.

In an embodiment, a configuration parameter used by the project relationship service 302 determines a total number of permissible nested levels within the project storage environment for the subdirectories. In another case, the total permissible nested levels is reached, the project relationship service 302 permits additional subdirectories for the project 301 and creates and manages those additional subdirectories at a root level of the root directory.

Figure 4:
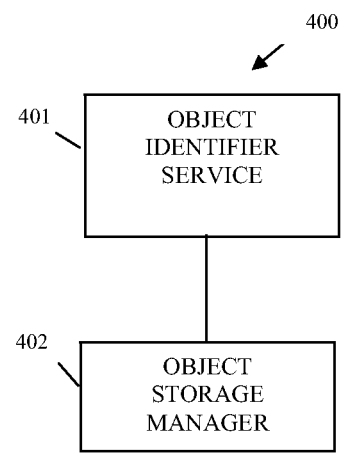
FIG. 4 is a diagram of another object relationship management system, according to an example embodiment.

FIG. 4 is a diagram of another object relationship management system 400, according to an example embodiment. The object relationship management system 400 is implemented as instructions on or within a machine-accessible and computer-readable storage medium. The instructions when executed by a machine (such as a computer) perform various aspects of the processing depicted with respect to the methods 100 and 200 of the FIGS. 1A and 2, respectively, and processing associated with the system 300 of the FIG. 3. The object relationship management system 400 is also operational over a network and the network may be wired, wireless, or a combination of wired and wireless.

The object relationship management system 400 includes an object identifier service 401 and an object storage manager 402. Each of these components and their interactions with one another will now be discussed in turn.

The object identifier service 401 is implemented in a machine-accessible and computer-readable storage medium and is to process on a machine within the network.

The object identifier service 401 provides a unique identifier for each object of a project and provides a mapping between each object reference and its corresponding unique identifier.

In an embodiment, the object identifier service 401 randomly generates each of the unique identifiers on initial creation and initial assignment of the unique identifiers.

The object storage manager 402 is implemented in a machine-accessible and computer readable storage medium and is to process on the same machine as the object identifier service 401 or an entirely different machine of the network. Example processing associated with the object storage manager was described in various aspects above with reference to the methods 100 and 200 of the FIGS. 1A and 2, respectively and with respect to the system 300 of the FIG. 3.

The object storage manager 402 consults the object identifier service 401 to acquire the unique identifiers for storing and loading the objects of the project. The object storage manager 402 maintains hierarchical relationships between the objects via a storage organization within a project storage environment for files named using the unique identifiers.

According to an embodiment, the object storage manager 402 renders the project and the hierarchical relationships in a graphical user interface (GUI) presentation format for a requesting user on demand by dynamically traversing the storage organization. So, the object storage manager 402 presents the project and the objects in a graphical presentation that is dynamically derived from the storage organization of the objects.

In an embodiment, the object storage manager 402 permits a requesting user to request particular hierarchical relationships via a search that the object storage manager 402 intercepts and processes by inspecting the storage organization to satisfy the search.

In another situation, the object storage manager 402 permits the files for the objects to include relationship names and the unique identifiers that a requesting user can use to query against the objects of the project. Examples of this were discussed and presented above with the example illustrations that follow the discussion of the FIG. 1A.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
  acquiring, by an object relationship service represented as executable instructions that execute on a processor, unique identifiers for objects from a project schema of a project, each object having a specific unique identifier, and identifying each object as instructions for a particular software module that is processed with the project;
  maintaining, by the object relationship service, a mapping that represents hard-coded hierarchical relationships between the objects defined in the project schema;
  removing, by the object relationship service, the hard-coded hierarchical relationships in the schema and the objects;
  creating, by the object relationship service, directories and files within those directories uniquely representing the objects and the mapping with each container object stored in a unique directory named with that container's unique identifier and each object stored in a unique file named with that object's unique identifier;
  organizing, by the object relationship service, the directories and files into a storage organization that represents the mapping; and
  managing, by the object relationship service, the objects and the mapping for the project through loading of the objects from the directories and files into memory recreating the mapping and through writing changes made the objects into corresponding ones of the directories and the files as a modified storage organization reflecting any changes to the mapping.

2. The method of claim 1, wherein acquiring further includes randomly generating each of the unique identifiers.

3. The method of claim 2, wherein randomly generating further includes randomly producing each identifier to a predefined length selected from a predefined set of character sets.

4. The method of claim 1 further comprising, rendering, by the object relationship service, the project and the mapping in a graphical user interface presentation format.

5. The method of claim 1 further comprising, searching by the object relationship service, the storage organization for one or more particular objects as one or more particular files based on a supplied hierarchical relationship used by a user as a search.

6. The method of claim 1, wherein retaining further includes preventing details associated with the hierarchical relationships from being stored within the files or the objects.

7. A method, comprising:
  identifying, by a project relationship manager represented as executable instructions that execute on a processor, unique identifiers for objects of a project, and identifying each object as instructions that are executed by the processor;
  organizing, by the project relationship manager, a storage organization for the objects that maintains and represents hierarchical relationships between the objects using the unique identifiers without using any hard-coded references maintained for and with the objects or with a project schema for the project during execution of the objects when processing the project by creating folders and files within the storage organization utilizing the unique identifiers as folders and files within the folders and the hierarchical relationships derived from the storage organization;
  loading, by the project relationship manager, the files from memory recreating the hierarchical relationships from the storage organization into the memory when the project is loaded for processing; and
  writing, by the project relationship manager, any changes made to the hierarchical relationships during processing of the project from the memory to corresponding ones of the folders and the files in a modified storage organization.

8. The method of claim 7, wherein identifying further includes generating each of the unique identifiers.

9. The method of claim 7 further comprising, searching, by the processor, the storage organization using a particular unique identifier to discover particular hierarchical relationships for a particular object associated with the particular identifier.

10. The method of claim 7 further comprising, searching, by the project relationship manager, the storage organization for a particular hierarchical relationship to discover particular unique identifiers for particular objects associated with the particular hierarchical relationship.

11. The method of claim 7 further comprising, presenting, by the project relationship manager, the hierarchical relationships of the objects on a display associated with the processor.

12. The method of claim 10, wherein presenting further includes providing the presentation within a graphical user interface.

13. A system, comprising:
  a non-transitory storage medium representing storage of a file system; and
  a storage manager operable to:
  (i) execute on a processor;
  (ii) organize the storage in a storage organization as created files within the storage using a mapping that is derived from hardcoded relationships defined in a schema for objects of a project and derived from the objects, wherein the mapping is based on naming the files with unique identifiers for each of the objects and storing the files in the storage organization;
  (iii) load the files as the objects into memory and recreate the mapping defining the hardcoded relationships when the project is loaded into memory for processing; and
  (iv) write any changes made in the mapping during processing of the project from the memory into corresponding ones of files in a modified storage organization within the storage.

14. The system of claim 13, wherein the storage manager is further operable to (v) search the storage using a name for a particular object and return a reference to at least one particular hierarchical relationship for that particular object.

15. The system of claim 13, wherein the storage manager is further operable to (v) search the storage using a name for a particular hierarchical relationship and return a reference to at least one particular object associated with that particular hierarchical relationship.

16. The system of claim 13, wherein the storage manager is further operable to (v) derive a graphical presentation for presentation on a display associated with the processor that graphically depicts the objects and the mapping.

* * * * *